Feb. 17, 1948.                    J. C. AUTEN                    2,436,186
                        TRANSMISSION CONTROL MECHANISM
                Original Filed April 4, 1945          2 Sheets-Sheet 1
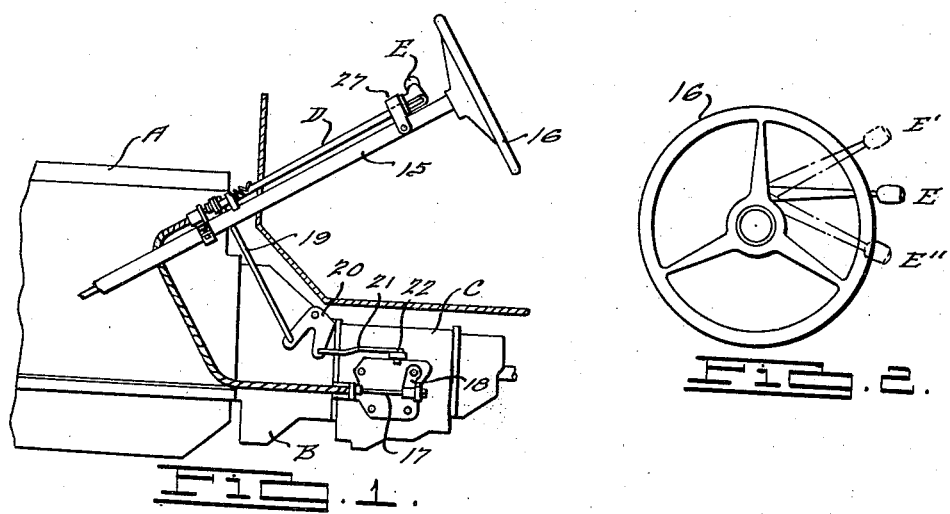
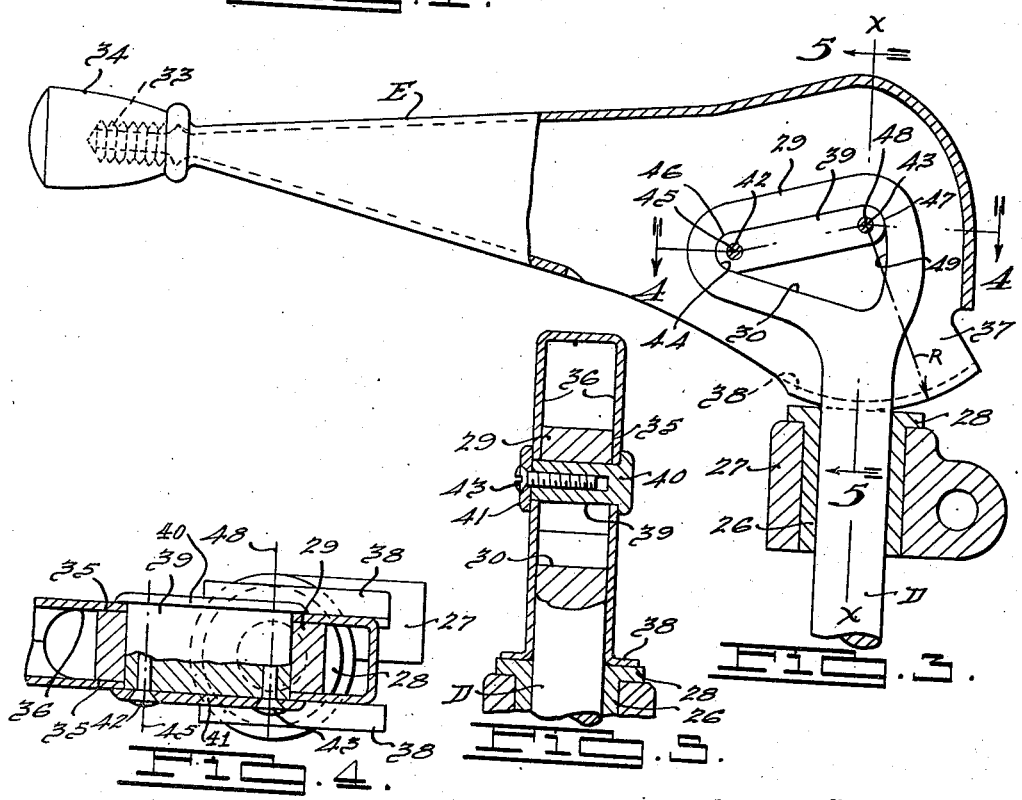
INVENTOR.
Jay C. Auten.
BY
Harness and Harris
ATTORNEYS.

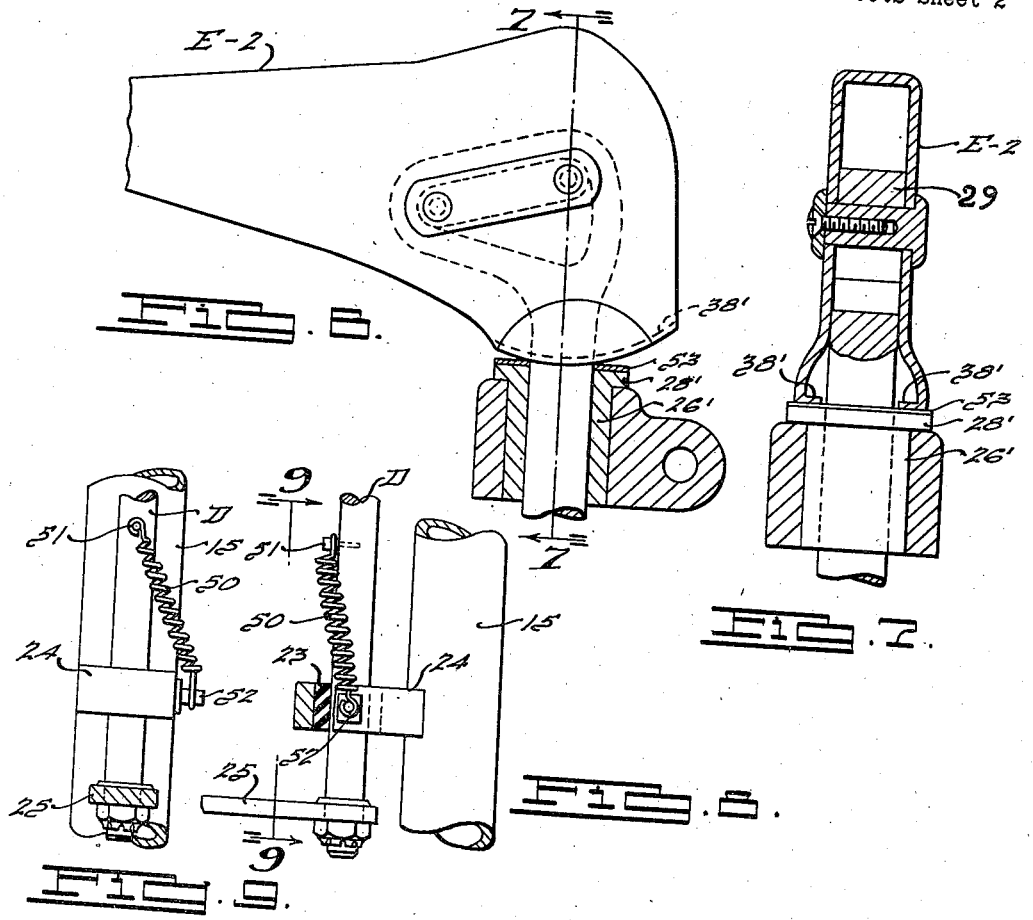
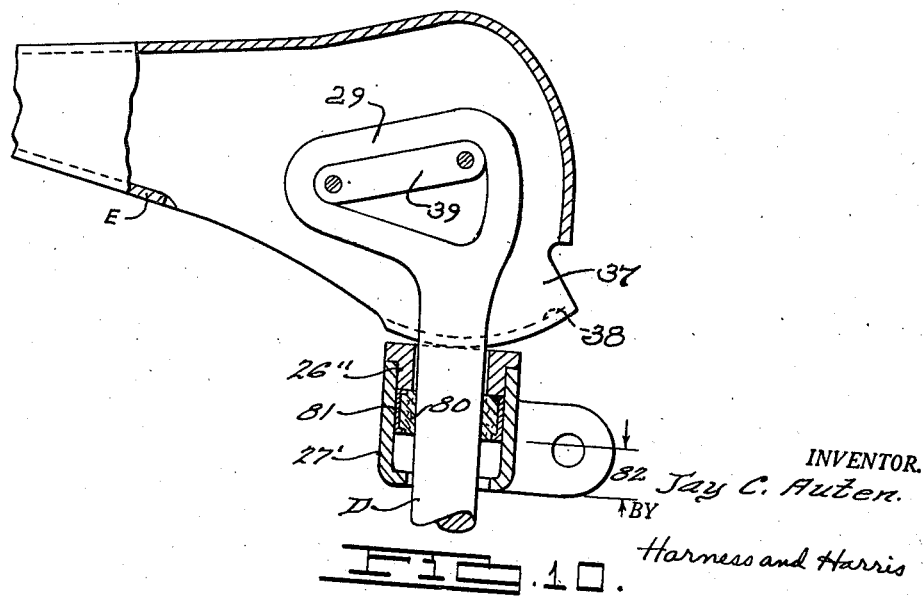

Patented Feb. 17, 1948

2,436,186

UNITED STATES PATENT OFFICE 2,436,186

TRANSMISSION CONTROL MECHANISM

Jay C. Auten, Royal Oak, Mich., assignor to Chrysler Corporation, Highland Park, Mich., a corporation of Delaware Original application April 4, 1945, Serial No. 586,498. Divided and this application February 21, 1946, Serial No. 649,197

8 Claims. (Cl. 74—484)

1

This invention relates to transmission control mechanism and refers more particularly to improvements in transmission remote shift mechanism especially adapted for mounting on motor vehicle steering posts. This application is a division of my co-pending application, Serial No. 586,498, filed April 4, 1945, now Patent No. 2,432,711, issued December 16, 1947.

It is an object of my invention to provide a control mechanism capable of being manufactured at lower cost than devices of this general type heretofore known.

Another object is to provide a control which is less likely to rattle than known devices and which will give better service and have longer life, also a control mechanism having improved characteristics of thrust application from the hand lever to the main steering post mounted selector operating control rod.

A further object is to provide a control operable with a minimum of friction and noise.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto.

Fig. 2 is a plan view of the steering wheel and driver operable shift lever as viewed by the vehicle driver.

Fig. 3 is a sectional elevational view through the shift lever and connection to the steering post mounted control rod.

Fig. 4 is a detail sectional plan view taken as indicated by line 4—4 of Fig. 3.

Fig. 5 is a sectional elevational view taken as indicated by line 5—5 of Fig. 3.

Fig. 6 is an elevational view, partly in section, of a modified type of fulcrum bushing for a shift lever of slightly modified form.

Fig. 7 is a sectional elevational view through the shift lever as indicated by line 7—7 of Fig. 6.

Fig. 8 is an enlarged elevational view illustrating the biasing means for the shift mechanism as viewed in Fig. 1.

Fig. 9 is a side elevational view of the Fig. 8 structure taken as indicated by line 9—9 of Fig. 8.

Fig. 10 is a detail sectional elevational view illustrating a modified bushing structure for the main control rod.

In the drawings, I have illustrated my invention

2 in connection with a motor vehicle comprising the well known engine A, clutch B, and any type of transmission C which is adapted to be manipulated at least in part by the vehicle driver. In general, my invention provides improvements in the transmission control mechanisms illustrated in the patents to F. W. Slack, No. 2,291,111, of July 28, 1942, and O. E. Fishburn, No. 2,284,191, of May 26, 1942, and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connection, such as through the link 19 and lever systems 19, 20, 21, to the transmission lever 22 thereby to operate the transmission speed ratio control element which has been selected by longitudinal movement of rod D.

Rod D may be suitably guided adjacent its lower end to accommodate its rotary and longitudinal movements as in the yielding bushing 23 (Fig. 8) carried by bracket 24 rigidly mounted on post 15. Rod D may be assembled downwardly in its bushing mountings, a lever 25 being thereafter fixed to the rod for operating link 19. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 to receive a lever operating and guide means. A shift lever E comprises a hollow steel stamping terminating outwardly in a stem portion 33 threaded to receive the handle or knob 34 adapted to be grasped by the driver in manipulating lever E. If desired, the outer end of shift lever E may be formed as an integral part of the lever instead of as a separate part connected thereto. At its inner end, the walls of lever E form a housing for the rod head 29, the sides 35 of the latter slidably engaging the inner side faces of the lever side walls 36 of lever E thereby maintaining the lever against lateral displacement relative to rod D. This housing portion of lever E opens downwardly at 37 above bushing 26 and for providing a slidable fulcrum mounting of lever E on bushing 26, lever fulcrumming rockers are carried by the lever. In the Fig. 3 embodiment of my invention these rockers or cams are formed adjacent the lower boundary of opening 37 in the form of the laterally extending support flanges 38 having shift lever supporting faces adapted to bear on the upper face of the bushing flange 28. Reference may be made to my copending application Serial No. 586,498 which describes and claims certain features illustrated in Fig. 3.

In Fig. 3 the rocker flanges 38 are deflected laterally outwardly from the depending side walls 36 of lever E and away from each other, such arrangement permitting these side walls to be fashioned smoothly for a freely fitting engagement with the sides 35 of head 29 as aforesaid and at the same time permitting the rod head 29 to be assembled with lever E by inserting head 29 directly into opening 37 between rockers 38. However, if desired, the rockers 38 may be deflected laterally inwardly toward each other as in the Fig. 7 embodiment. Rockers 38 are spaced from each other at opposite sides of axis X—X of rod D, the rockers extending in the general direction of the shift lever E so as to intersect a plane through axis X—X transversely to lever E.

The fulcrum point for lever E remains, during operation of the lever, substantially in a plane through axis X—X transverse to the lever. It is desirable to maintain the fulcrum point closely adjacent the rod axis X—X to minimize lateral loads on rod D and this has been accomplished in the accompanying embodiments of my invention.

I have provided means supported between the depending side walls of lever E and cooperating with the slotted formation of the lever head 29 for effecting lift of the rod D in response to lift of lever handle 34 and also for maintaining lever E positioned against undesired displacement in the direction of its length transversely to the axis X—X, this means cooperating with the flanges 38 and fulcrum bushing 26 to guide up and down shifting movements of lever E. In Fig. 3 this means comprises a plate 39 extending between the side walls of lever E and having a flanged head 40 seating externally on one side wall, a companion flanged head 41 seating on the opposite side wall and being secured to the plate 39 by fasteners 42 and 43.

Plate 39 extends through slot 30 which is generally triangular in shape having its apex of cylindrical contour at 44 centered about an axis 45 to rotatably fit the cylindrical end 46 of plate 39. The other end of the plate is likewise cylindrically formed at 47 about an axis 48 for engagement with the base 49 of the slot 30, this being of arcuate formation centered on axis 45.

In the Fig. 3 position of the parts with the lever E in its lowermost neutral position the upper face of plate 39 engages the upper wall or side of the triangular slot 30 and when the lever is fully swingingly raised then the lower face of plate 39 engages the lower wall or side of slot 30, the plane containing the parallel axes 45 and 48 thus sweeping through an angle approximately bisected by a plane normal to axis X—X and containing axis 48. Thus, by preference, the plate 39 is initially downwardly and outwardly inclined so that in lifting lever E the axis 45 moves substantially vertically in applying its lift to rod D with a minimum of side thrust on the rod D. However, if desired, the plate 39 may have an initial position horizontally or at some inclination other than that shown.

The flanges 38 are preferably of arcuate formation on a radius R about the axis 48 and this axis preferably intersects axis X—X or lies closely adjacent thereto in order to cause lever E to swing vertically about the axis of rod D without undue side thrust thereon and in order to maintain a fixed distance R between the lever axis 48 and the fulcrum surface at 28. With such an arrangement the axis 48 neither rises nor falls for vertical shifts of lever E and, therefore, neither gains nor loses effective lift on the rod D. Of course by curving flanges 38 about an axis either above or below that illustrated at 48, the effective lift of lever E will be either supplemented by increased lift or decreased lift as the case may be. Furthermore, flanges 38 could be of non-uniform curvature for camming lift if desired.

During upward swing of lever E from Fig. 3 to Fig. 6, the lever axis of rotation 48 has an imperceptible displacement laterally of axis X—X as the plate 39 moves perpendicular to axis X—X and the lever is free to so move by slight slip at the fulcrum support 28 as will presently be apparent.

In order to minimize friction between the fixed fulcrum bushing 26 and the lever flanges 38 slidably seated thereon and to provide for an easy noiseless shift of lever E both vertically and horizontally or laterally, I form the bushing, or its lever supporting face, of some metal composition different from that of the lever flanges. Thus in Fig. 3 the bushing 26 is formed by molding and sintering powdered metal or metals of different melting points in a manner now well known in forming porous metal bearings of the self-lubricating type as, by way of example, set forth in patent to C. A. Tea, 1,927,619, of September 19, 1933, and to W. G. Calkins et al., 1,927,627, of September 19, 1933. Lubricant may be provided in the form of graphite included in the metal mixture supplemented by or substituted by fluid lubricant absorbed by immersing the bushing in lubricating oil then to be exuded to the fulcrum surface of bushing flange 28.

Following present known arrangements in remote gearshift mechanisms in general use, rod D is preferably biased downwardly at some convenient point or points in the connections of the operating system, usually within the transmission C. This serves to maintain lever E in its Fig. 3 neutral downwardly swung position known as the high speed range ready to be rotated forwardly about axis X—X to the position E' in Fig. 2 for forward transmission drive setting or rearward to E'' for forward drive in high. Lever E is lifted in neutral and then moved forward about axis X—X for reverse, or rearward for forward drive in low, this latter position being omitted in some well-known shift arrangements especially where the manual shifts are supplemented by automatic shift functions in the transmission.

Because of the inclination of post 15 and rod D, and the mass of lever E, the lever when in the forward position E' has a tendency to work back to neutral especially when driving the car over rough roads. In order to offset this tendency and to also bias the lever E downwardly, I have provided a coil spring 50 (Figs. 8 and 9) having its upper end secured at 51 to rod D. The lower end of this spring is secured at 52 to bracket 24 and is displaced rotatably about axis X—X relative to the end at 51 in a direction tending to bias lever E forwardly from its neutral position, the displacement being such that with the lever shifted to the position E' the spring 50 will act to counterbalance and offset the tendency of the lever to jiggle out of the position E. At the same time spring 50 exerts a constant downward pull on rod D so that lever E is maintained seated on bushing 26 and to maintain an anti-rattle connection between rod D and lever E. Reference may be made to my copending application Serial No. 649,194 which describes and claims certain features illustrated in Figs. 8 and 9.

With lever E in its Fig. 3 neutral position, rod D is biased downward causing head 29 to seat on the upper face of plate 39 thereby forcing the lever E to seat at its flanges 38 on the bushing flange 28 stationarily mounted on the post 15. Rotation of lever E either fore or aft will cause the lever and rod D to rotate as a unit about axis X—X, head 29 fitting the side walls of lever E. During this movement flanges 38 rotatably slidably bear on the bushing flange 28. The lubricant content of the bushing 26 insures the desired freedom of sliding contact at flanges 38 free from noise and undue wear.

When lever E is lifted from the Fig. 3 neutral position, preparatory for a rotational shift in the raised position, flanges 38 wipe across flange 28 at the bushing contact substantially in a plane transversely to the shift lever through axis X—X or closely adjacent thereto as in Fig. 3 while the plate portion at 46 lifts the head 29. During this lift, the lever E rotates about axis 48 in providing a mechanical advantage for lifting rod D in the ratio of the effective lengths of lever E and plate 39 from axis X—X. After the lever has been lifted then it is swung about axis X—X. The wiping and rotating movements of flange 38 on flange 28 brings into action at different times the various portions of flanges 38 with the various portions of flange 28 so that there is no tendency to wear a groove in the fulcrum surface of flange 28.

In Figs. 6 and 7, I have illustrated a slightly modified bushing 28' which may be employed in lieu of the bushing 26 wherever illustrated in my drawings. The bushing is of steel or other metal faced at 53 with the aforesaid material forming bushing 26. The facing 53 is fused with the bushing flange 28' and provides all the aforesaid functions of flange 28. Inasmuch as the special bearing material is desired for co-action with flanged rockers 38' which are carried by the shift lever, it may be more economical in some instances to form the bushing as in Figs. 6 and 7.

Furthermore, Figs. 6 and 7 illustrate a lever E—2 similar to lever E but differing therefrom in that its side walls, below the engagement with head 29, flare laterally outwardly and downwardly to accommodate forming the arcuate rocker flanges 38' directed inwardly toward each other instead of outwardly as in Fig. 5. Otherwise the parts may be as previously described. Obviously lever E—2 may, if desired, be substituted for lever E in Fig. 3 for engagement either with bushing 26 or 26', or with some other type of fulcrum.

Referring to Fig. 10, I have illustrated a modified form of bracket mounting for the shift lever.

In Fig. 10 the bracket 27' is adapted to be secured to the steering column as in Fig. 1. The rod D extends through the bracket opening with a sliding guide fit in a bushing 80 of yielding material carried in a steel backing 81 press fitted within the bracket 27'. Adjacent and above bushing 80 is a bushing 26" of material similar to bushing 26 aforesaid. Bushing 26" is flanged to overlie the upper face of the bracket and provide a fulcrum face for the shift lever of any of my embodiments, this bushing having a clearance with rod D. Bushing 26" is press fitted in bracket 27'.

In Fig. 10 the bracket 27' extends a distance 82 below the bushing 80 equal to approximately the vertical movement of rod D such that the portion of the rod which slidably engages bushing 80 is not exposed to view below bracket 27'. Thus rod D may be painted up to the bracket 27' and when rod D is lifted, the painted part will not engage bushing 80 as otherwise it might seize in the bushing and otherwise mar or injure the parts.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a bushing fixed relative to the steering column and having a flange formed of sintered powdered metal having a lubricant content forming an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said shift lever having a pair of rockers rigidly carried thereby in lever-fulcruming engagement with said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

2. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having a driver operable end portion and an opposite hollow end portion formed with bounding side walls each having a fulcruming rocker carried thereby, said rockers extending generally longitudinally of said shift lever and being spaced from each other in a direction transversely of said shift lever, said rod extending upwardly through the space between said rockers and having its said lever portion disposed within said hollow portion of said shift lever, means operably connecting said offset end of said rod to said shift lever for effecting axial and rotating movements of said rod respectively in response to vertical swinging and lateral shifting movements of said shift lever, a fulcrum mounted on the steering column, said fulcrum comprising a metallic part having a lubricant content, and means biasing said rod and shift lever downwardly to maintain said rockers engaged with said fulcrum during said swinging and shifting movements of said shift lever.

3. In a steering column mounted control for a motor vehicle transmission, a bracket fixed to the steering column, a bushing fixed to said bracket and having a flange overlying said bracket to present a fulcruming face, said bushing having an opening therethrough, at least the said face of said bushing being of porous metal having a lubricant content, a shift lever having a rocker carried thereby, said rocker being arcuate and curved out of the plane of said bushing face and adapted to slide in lever-fulcruming engagement with said bushing face, and a transmission control rod extending through said bushing opening for connection with said shift lever.

4. In a transmission control, a shift lever, means operably connecting said lever with said transmission for effecting shift control thereof by operation of said lever, and a fulcrum for said lever, said lever having an arcuate part in straight line sliding contact with said fulcrum, said fulcrum comprising a body of porous sintered powdered metal having a lubricant content.

5. In a transmission control, a shift lever, means operably connecting said lever with said transmission for effecting shift control thereof by operation of said lever, a stationarily mounted bracket having an opening therethrough, said operably connecting means comprising a rod extending with clearance through said opening and adapted to be axially reciprocated by said shift lever, a metallic bushing fitting the upper end of said bracket opening and having a flange overlying the upper face of said bracket, at least the upper surface of said flange being formed of sintered powdered metal having a lubricant content, said bushing having an opening through which said rod extends, a non-metallic bushing within said bracket opening adjacent said metallic bushing and disposed therebelow, said non-metallic bushing having an opening therethrough fitting said rod, said bracket opening extending below said non-metallic bushing for at least approximately the amount of axial movement imparted to said rod by said shift lever, said lever having a part slidably engageable with said bushing flange for fulcruming said lever.

6. In a transmission control, a shift lever, means operably connecting said lever with said transmission for effecting shift control thereof by operation of said lever, and a fulcrum for said lever, said lever having a pair of rockers in simultaneous sliding contact with said fulcrum, said fulcrum comprising a body faced on its upper surface with a porous sintered powdered metal having a lubricant content.

7. In a steering column mounted control for a motor vehicle transmission, a bracket fixed to the steering column, a bushing fixed to said bracket and having a flange overlying said bracket, said flange having a body portion and a fulcruming face portion, said face portion being formed of a porous sintered powdered metal having a lubricant content, and said face portion being fused to said body portion, said bushing having an opening therethrough, a shift lever having a rocker carried thereby in straight line sliding lever-fulcruming engagement with said bushing face, and a transmission control rod extending through said bushing opening for connection with said shift lever.

8. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion formed with a pair of depending side walls within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a bushing fixed relative to the steering column and having a flange formed of sintered powdered metal having a lubricant content forming an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, said shift lever having depending side walls being flared laterally outwardly and downwardly and each having a flange forming a rocker directed inwardly toward said rod, said rockers being carried in lever fulcruming engagement with said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

JAY C. AUTEN.

REFERENCES CITED

The following references are of record in the file of this patent:

UNITED STATES PATENTS

| Number | Name | Date |
|---|---|---|
| 1,912,101 | Short | May 30, 1933 |
| 2,192,252 | Dolza et al. | Dec. 5, 1939 |
| 2,303,787 | Burd | Dec. 1, 1942 |

Certificate of Correction

Patent No. 2,436,186.  February 17, 1948.

JAY C. AUTEN

It is hereby certified that error appears in the printed specification of the above numbered patent requiring correction as follows: Column 5, line 18, for "E" read $E'$; and that the said Letters Patent should be read with this correction therein that the same may conform to the record of the case in the Patent Office.

Signed and sealed this 2nd day of November, A. D. 1948.

[SEAL]

THOMAS F. MURPHY,
*Assistant Commissioner of Patents.*